(12) United States Patent
Eritate (10) Patent No.: US 9,102,793 B2
(45) Date of Patent: Aug. 11, 2015

(54) POLYESTER RESIN, METHOD OF PRODUCING THE SAME, COMPOSITION FOR MOLDED ARTICLE AND MOLDED ARTICLE

(71) Applicant: CANON KABUSHIKI KAISHA, Tokyo (JP)

(72) Inventor: Shinji Eritate, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/829,138

(22) Filed: Mar. 14, 2013

(65) Prior Publication Data

US 2013/0225784 A1 Aug. 29, 2013

Related U.S. Application Data

(62) Division of application No. 12/441,797, filed as application No. PCT/JP2009/053123 on Feb. 17, 2009, now Pat. No. 8,420,769.

(30) Foreign Application Priority Data

Feb. 20, 2008 (JP) .................................. 2008-039360

(51) Int. Cl.
*C08G 63/672* (2006.01)
*C08G 63/676* (2006.01)

(52) U.S. Cl.
CPC ............ *C08G 63/676* (2013.01); *C08G 63/672* (2013.01)

(58) Field of Classification Search
CPC ............... C08G 18/2805; C08G 18/30; C08G 18/4222; C08G 18/798; C08G 2150/20; C08G 2250/00; C08G 63/12; C08G 63/19; C08G 63/547; C08G 63/66; C08G 63/672; C08G 63/676
USPC .......................................... 528/272, 300, 306
See application file for complete search history.

(56) References Cited

U.S. PATENT DOCUMENTS

| 2,551,731 | A | 5/1951 | Napier et al. | |
|---|---|---|---|---|
| 4,975,233 | A | * 12/1990 | Blaeser et al. | ............. 264/210.6 |
| 6,025,061 | A | 2/2000 | Khanarian et al. | |
| 7,923,494 | B2 | 4/2011 | Shimizu | |
| 2009/0018264 | A1 | 1/2009 | Fuseya | |
| 2009/0043018 | A1 | 2/2009 | Tanaka et al. | |

FOREIGN PATENT DOCUMENTS

| CN | 1298346 A | 6/2001 |
|---|---|---|
| DE | 199 28 927 A1 | 12/2000 |
| JP | 2002-512269 A | 4/2002 |
| JP | 2007-146153 A | 6/2007 |
| WO | 2007/052847 A1 | 5/2007 |

OTHER PUBLICATIONS

Rieckmann et al. Modern Polyesters. Chapter II, 2003.*
Office Action in Japanese Application No. 2008-039360 (dated Apr. 30, 2013).
Reinhard Storbeck et al., "Synthesis and Properties of Polyesters Based on 2,5-Furandicarboxylic Acid and 1,4:3,6-Dianhydrohexitols," 34 (23) Polymer 5003-06 (Jan. 1993).
Office Action in Chinese Application No. 200980105902.9 (Feb. 21, 2012).
International Search Report in PCT/JP2009/053123 (dated May 2009).
International Preliminary Report on Patentability (with Written Opinion) in PCT/JP2009/053123 (dated Sep. 2010).
Masahiko Okada et al., "Biodegradable Polymers Based on Renewable Resources," 35 (Part A) J. Polymer Sci. 2729-2737 (1997).
F.M. Medvedeva et al., "Mixed Polyesters of Ethylene Glycol and 2,5-Furandicarboxylic and Terephthalic acids," 2(1) Plast. Mass. 14-15 (Feb. 1963).
MEGlobal, Diethylene Glycol High purity MSDS, published online Mar. 2011.

* cited by examiner

*Primary Examiner* — Ling Choi
*Assistant Examiner* — Gennadiy Mesh
(74) *Attorney, Agent, or Firm* — Fitzpatrick, Cella, Harper & Scinto (57) ABSTRACT

A polyester resin comprising residues of 2,5-furandicarboxylic acid and a diol, which can be used for producing a molded article having excellent impact resistance, and a method of producing the polyester resin. The polyester resin has structural units represented by general formulae (1) and (3):

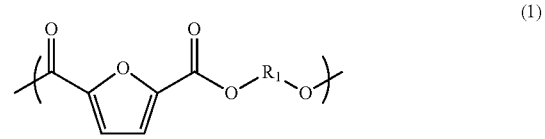

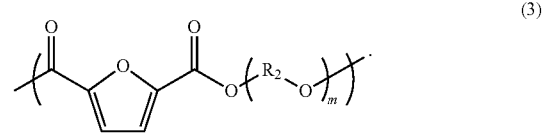

$R_1$ in general formula (1) is an optionally substituted acyclic aliphatic hydrocarbon group. $R_2$ in general formula (3) represents an alkylene group, and m represents an integer from 2 to 1,140, provided that a case where $R_2$ represents an ethylene group and m represents 2 is excluded.

7 Claims, 7 Drawing Sheets

POLYESTER RESIN, METHOD OF PRODUCING THE SAME, COMPOSITION FOR MOLDED ARTICLE AND MOLDED ARTICLE

CROSS-REFERENCE TO RELATED APPLICATIONS

This application is a divisional of application Ser. No. 12/441,797, which was the National Stage of International Application No. PCT/JP2009/053123, filed Feb. 17, 2009, which claims the benefit of Japanese Patent Application No. 2008-039360, filed Feb. 20, 2008. All prior applications are hereby incorporated by reference herein in their entirety.

TECHNICAL FIELD

The present invention relates to a polyester resin useful for various resin materials, a method of producing the polyester resin, a composition for a molded article, and a molded article.

BACKGROUND ART

Polymer materials typified by, for example, polyolefin resin-, polyester resin-, polyamide resin-, polyacrylate resin-, polycarbonate resin-, and polyimide resin-based materials have been widely utilized as various industrial materials. These general-purpose polymer materials have excellent mechanical and physical properties, such as heat resistance and impact resistance, but they hardly decompose in the environment and remain in the ground semipermanently when buried.

Biodegradable materials have been attracting attention in recent years, and the development of biodegradable resins, such as an aliphatic polyester resin, has been actively performed. Plant-derived resins have been attracting attention because of their potential to serve as carbon-neutral materials, because carbon dioxide produced by the decomposition of the resins may be such that carbon dioxide originally present in the air is immobilized.

Of the plant-derived resins, polylactic acid has been mainly applied to, for example, packages for OA systems and home appliances, automobile parts, bottles, films, sheets, and eating utensils. In general, however, high impact resistance is often needed in those applications. At present, it is difficult to use polylactic acid, which has extremely low impact resistance, in such applications, so the actual use of polylactic acid has been limited. There has been a growing demand from the industrial community for a plant-derived resin with improved impact resistance, because the resin can be expected to find use in a variety of applications. Accordingly, various kinds of approaches have been taken to improve the impact resistance of a plant-derived resin.

To be specific, a polyester resin using a plant-derived material has been reported as one approach to improving the impact resistance of a plant-derived resin (Japanese Patent Application Laid-Open No. 2007-146153).

DISCLOSURE OF THE INVENTION

In Japanese Patent Application Laid-Open No. 2007-146153, the following resin has been obtained: the resin has a furan ring-containing skeleton structure, and its degree of polymerization is specified so that its mechanical physical properties may be improved. However, it cannot be said that the improvement in impact resistance achieved by the method described in Japanese Patent Application Laid-Open No. 2007-146153 is always sufficient. Accordingly, an additional improvement in impact resistance of the plant-derived resin has been requested in order that the resin may be able to find use in a variety of applications.

The present invention has been made in view of such background art, and an object of the present invention is to provide a novel polyester resin that can be used for producing a molded article excellent in impact resistance, and a method of producing the polyester resin.

Another object of the present invention is to provide various molded articles each excellent in impact resistance by using the above polyester resin.

A polyester resin which solves the above-mentioned problems includes: a structural unit represented by the following general formula (1); and a structural unit represented by the following general formula (2), in which the polyester resin contains the structural unit represented by the general formula (2) at a content of 50.1 mol % or more to 99.9 mol % or less with respect to a total of the structural units represented by the general formulae (1) and (2):

where $R_1$ represents an aromatic hydrocarbon group which may be substituted, or an aliphatic hydrocarbon group which may be substituted A polyester resin which solves the above-mentioned problems includes: a structural unit represented by the following general formula (1); and a structural unit represented by the following general formula (3):

where $R_1$ represents an aromatic hydrocarbon group which may be substituted, or an aliphatic hydrocarbon group which may be substituted, where $R_2$ represents an alkylene group, and m represents an integer in a range of 2 or more to 1,140 or less, provided that a case where $R_2$ represents an ethylene group and m represents 2 is excluded.

In addition, a composition for a molded article which solves the above-mentioned problems includes the above polyester resin.

Further, a molded article which solves the above-mentioned problems is obtained by molding the composition for a molded article containing the above polyester resin.

Further, a method of producing a polyester resin which solves the above-mentioned problems includes copolymerizing one of a furandicarboxylic acid and an ester thereof with ethylene glycol and diethylene glycol, in which diethylene glycol is used at a content of 50.1 mol % or more to 300 mol % or less with respect to one of the furandicarboxylic acid and the ester thereof.

Further, a method of producing a polyester resin which solves the above-mentioned problems includes copolymerizing one of a furandicarboxylic acid and an ester thereof with ethylene glycol and polyethylene glycol.

According to the present invention, there may be provided a polyester resin excellent in impact resistance and suitable for various materials for producing molded articles, and a method of producing the polyester resin.

In addition, according to the present invention, there may be provided various molded articles each excellent in impact resistance by using the above polyester resin.

Further features of the present invention will become apparent from the following description of exemplary embodiments with reference to the attached drawings.

BEST MODE FOR CARRYING OUT THE INVENTION

Hereinafter, the present invention will be described in detail.

As a result of extensive studies, the inventor of the present invention has found that the above objects can be achieved by copolymerizing desired components. Thus, the inventors have completed the present invention. That is, the present invention is characterized in that an ether bond showing flexibility is introduced into a polyester resin having a furan ring.

The inventor has found the following: in the case where diethylene glycol is used as a diol component, the impact resistance of the polyester resin is improved by virtue of the flexibility of the ether bond when the content of diethylene glycol out of the diols in the polyester is 50.1 mol % or more to 99.9 mol % or less. That is, when the polyester resin has a furan ring as a dicarboxylic acid component, and, furthermore, the content of diethylene glycol out of the diol components is 50.1 mol % or more to 99.9 mol % or less, the polyester resin has a structure having an ether bond showing flexibility. Thus, the inventor has gained the following finding: a polyester resin with improved impact resistance can be obtained through the above procedure.

In addition, the inventor has found that the impact resistance can be improved by: using a dicarboxylic acid having a furan ring as a dicarboxylic acid component; and introducing a polyalkylene ether as a diol component. That is, the inventor has gained the following finding: when the polyester resin has a structure having a furan ring as a dicarboxylic acid component, and, furthermore, an ether bond showing flexibility, the impact resistance of the polyester resin can be improved.

In addition, the inventor has found that a molded article having excellent impact resistance can be obtained by using the above polyester resin as a composition for a molded article. The present invention has been accomplished based on such finding.

The polyester resin according to the present invention includes: a structural unit represented by the following general formula (1); and a structural unit represented by the following general formula (2), in which the polyester resin contains the structural unit represented by the general formula (2) at a content of 50.1 mol % or more to 99.9 mol % or less with respect to a total of the structural units represented by the general formulae (1) and (2):

$$\text{(1)}$$

where $R_1$ represents an aromatic hydrocarbon group which may be substituted, or an aliphatic hydrocarbon group which may be substituted,

(2)

The polyester resin according to the present invention includes: a structural unit represented by the following general formula (1); and a structural unit represented by the following general formula (3):

(1)

where $R_1$ represents an aromatic hydrocarbon group which may be substituted, or an aliphatic hydrocarbon group which may be substituted, (3)

where $R_2$ represents an alkylene group, and m represents an integer in a range of 2 or more to 1,140 or less, provided that a case where $R_2$ represents an ethylene group and m represents 2 is excluded.

The polyester resin according to the present invention is characterized in that the $R_1$ represents an ethylene group.

The polyester resin according to the present invention is characterized in that the $R_1$ represents an ethylene group, and the $R_2$ represents an ethylene group.

A composition for a molded article according to the present invention includes the above polyester resin.

A molded article according to the present invention is obtained by molding the composition for a molded article containing the above polyester resin.

The method of producing a polyester resin according to the present invention includes copolymerizing one of a furandicarboxylic acid and an ester thereof with ethylene glycol and diethylene glycol, in which diethylene glycol is used at a content of 50.1 mol % or more to 300 mol % or less with respect to one of the furandicarboxylic acid and the ester thereof.

The method of producing a polyester resin according to the present invention includes copolymerizing one of a furandicarboxylic acid and an ester thereof with ethylene glycol and polyethylene glycol.

The polyester resin having the structural units represented by the above general formulae (1) and (2) contains a portion having an ether bond showing flexibility, and imparts high impact resistance to a molded article obtained by using the resin.

The polyester resin having the structural units represented by the above general formulae (1) and (3) contains a portion having an ether bond showing flexibility, and imparts high impact resistance to a molded article obtained by using the resin.

2,5-furandicarboxylic acid is used as a raw material for the dicarboxylic acid having a furan ring. A product obtained by transforming a biomass such as cellulose, glucose, fructose, or mucic acid by a known method can be used as 2,5-furandicarboxylic acid. Accordingly, the use of a furan ring allows one to use a plant-derived material as an aromatic ring which contributes to the heat resistance of the molded article.

$R_1$'s in the formula (1) each represent an aromatic hydrocarbon group and a straight-chain or cyclic aliphatic hydrocarbon group, each of which may contain a substituent. Examples of the aromatic hydrocarbon group include condensed rings and heterocyclic divalent groups, such as a naphthalene ring, an indene ring, an anthracene ring, and a phenanthrene ring, in addition to a benzene ring, a biphenyl ring, and a bis(phenyl)alkane. Examples of the bis(phenyl)alkane include bis(2-hydroxyphenyl)methane and 2,2'-bis(hydroxyphenyl)propane. Examples of the heterocyclic ring include a five-membered ring, such as furan, thiophene, pyrrole, oxazole, thiazole, and imidazole; a six-membered ring, such as pyran, pyridine, pyridazine, pyrimidine, and pyrazine; and a condensed ring, such as indole, carbazole, coumarin, quinoline, isoquinoline, acridine, benzothiazole, quinolixane, and purine.

Examples of the straight-chain aliphatic hydrocarbon group include an ethylene group, a propylene group, an n-butylene group, an n-pentylene group, an n-hexylene group, and an n-heptylene group. Of those, straight-chain alkylene groups each having 2 to 4 carbon atoms such as an ethylene group, a propylene group, and an n-butylene group are preferable, and an ethylene group and an n-butylene group is particularly preferable.

$R_2$ in the formula (3) represents an alkylene group, and examples thereof may include an ethylene group, a propylene group, an n-butylene group, an n-pentylene group, an n-hexylene group, and an n-heptylene group. Of those, an ethylene group may be given as a particularly preferable example.

In the general formula (3), m represents an integer in the range of 2 or more to 1,140 or less; provided that, in the general formula (3), the case where $R_2$ represents an ethylene group and m represents 2 is excluded.

The polyester resin of the present invention desirably has a number average molecular weight in the range of 1,000 or more to 160,000 or less, or preferably 1,200 or more to 140,000 or less measured by a gel permeation chromatography (GPC) method involving dissolving the resin in 1,1,1,3,3,3-hexafluoro-2-propanol (HFIP). The molecular weight preferably falls within the range because the polyester resin shows excellent mechanical characteristics, and can be easily molded.

The polyester resin having the structural units represented by the general formulae (1) and (2) of the present invention can be synthesized by a method involving subjecting ethylene glycol and diethylene glycol, and the furandicarboxylic acid or an ester thereof to condensation polymerization in the presence of an excessive amount of a polyhydric alcohol.

The polyester resin having the structural units represented by the general formulae (1) and (3) of the present invention can be synthesized by a method involving subjecting ethylene glycol and polyalkylene ether, and the furandicarboxylic acid or an ester thereof to condensation polymerization in the presence of an excessive amount of a polyhydric alcohol.

2,5-furandicarboxylic acid, 2,4-furandicarboxylic acid and 3,4-furandicarboxylic acid can be exemplified as a raw material for the dicarboxylic acid having a furan ring. 2,5-furandicarboxylic acid is particularly preferably used. A product obtained by transforming a biomass such as cellulose, glucose, fructose, or mucic acid by a known method can be used as 2,5-furandicarboxylic acid. One kind or two or more kinds of them may also be used in combination.

Further, examples of esters of furandicarboxylic acid may include the above-described methylesters and ethylesters of dicarboxylic acid having a furan ring.

Specific examples include dimethyl 2,5-furandicarboxylic acid, diethyl 2,5-furandicarboxylic acid, ethylmethyl 2,5-furandicarboxylic acid, dipropyl 2,5-furandicarboxylic acid, dibutyl 2,5-furandicarboxylic acid, dimethyl 2,4-furandicarboxylic acid, diethyl 2,4-furandicarboxylic acid, dimethyl 3,4-furandicarboxylic acid, and diethyl 3,4-furandicarboxylic acid.

In addition, a mixture of the above can also be exemplified.

Further, examples of the polyhydric alcohol include those represented by the following formula (4).

R'—(OH)$_a$ (4)

In the formula (4), a may represent an integer of 2 or more, preferably represents 2 in order that a polyester resin having the structural units represented by the general formulae (1) to (3) may be obtained. In the formula, R' specifically represents, for example, a group represented by any one of $R_1$ and $R_2$ in the general formulae (1) to (3), or a group represented by any one of $R_1$ and $R_2$ having the same substituent as that specifically exemplified as a substituent for the above group. That is, R' represents an aromatic hydrocarbon group which may be substituted, or an aliphatic hydrocarbon group which may be substituted.

Specific examples of the divalent alcohol include the following. Straight-chain or cyclic aliphatic diols include ethylene glycol, 1,3-propanediol, 1,4-butanediol, and 1,4-cyclohexanedimethanol. Examples of the dihydroxybenzene include 1,3-dihydroxybenzene and 1,4-dihydroxybenzene. Examples of the bisphenol include bis(2-hydroxyphenyl) methane, 2,2'-bis(hydroxyphenyl)propane, and 2,2'-bis(4-hydroxyphenyl)-sulfone; glycerin, trimethylolpropane, pentaerythritol, sorbitol, and saccharides; and hydroxybenzoic acid. A combination thereof may be used as deemed appropriate.

Of those, ethylene glycol, 1,3-propanediol, and 1,4-butanediol are preferable.

Diethylene glycol can be used in accordance with the introduced amount at the time of the synthesis of the polyester resin having the structural units represented by the general formulae (1) and (2) of the present invention. In addition, a trace amount of diethylene glycol may be produced from ethylene glycol as a by-product in the polymerization process.

Examples of the polyalkylene ether to be used at the time of the synthesis of the polyester resin having the structural units represented by the general formulae (1) and (3) of the present invention include the following products.

The polyalkylene ether is specifically, for example, polyethylene glycol, polypropylene glycol, polybutylene glycol, polyhexane ether, or polyoctane ether, or a copolymer or mixture formed of two or more kinds of them.

The polyalkylene ether has a weight average molecular weight in the range of 200 or more to 50,000 or less, preferably 1,000 or more to 40,000 or less, or more preferably 2,000 or more to 30,000 or less.

The polyalkylene ether has a weight average degree of polymerization in the range of 3 or more to 1,140 or less, preferably 22 or more to 910 or less, or more preferably 44 or more to 680 or less.

A condensation polymerization method for diethylene glycol or the polyalkylene ether, the above dihydric alcohol, and the furandicarboxylic acid is, for example, a method involving directly subjecting them to condensation polymerization. Alternatively, the method is, for example, a method (ester exchange method) involving synthesizing an ester of diethylene glycol or the polyalkylene ether, the above dihydric alcohol, and the furandicarboxylic acid, and subjecting the ester to condensation polymerization. Examples of the condensation polymerization method for diethylene glycol or the polyalkylene ether, the above dihydric alcohol, and the furandicarboxylic acid include solution polymerization, bulk polymerization, suspension polymerization, and emulsion polymerization; each of these methods can be appropriately selected in accordance with a molded article to be produced. A polymerization temperature, a polymerization catalyst, a medium such as a solvent, and the like can be appropriately selected in accordance with each polymerization method.

The condensation polymerization method for diethylene glycol or the polyalkylene ether, the above dihydric alcohol, and the furandicarboxylic acid preferably includes an esterification step and a subsequent step of subjecting the resultant ester compound to polycondensation.

In the above esterification step, diethylene glycol or the polyalkylene ether, the dihydric alcohol, the furandicarboxylic acid, and the catalyst are gradually heated to a temperature in the range of 110° C. to 200° C., or preferably 150° C. to 180° C. while being stirred so that the ester compound may be obtained.

Diethylene glycol is used at a molar ratio in the range of preferably 50.1 mol % or more to 300 mol % or less, or more preferably 51 mol % or more to 290 mol % or less with respect to the furandicarboxylic acid or the ester thereof.

Polyalkylene ether is used at a molar ratio in the range of preferably 0.1 mol % or more to 80 mol % or less, or more preferably 0.5 mol % or more to 70 mol % or less with respect to the furandicarboxylic acid or the ester thereof.

In addition, the number of moles of the dihydric alcohol to be used is preferably 1 to 3 times as large as that of the furandicarboxylic acid or the ester thereof. An excessive amount of the dihydric alcohol, or a dihydric alcohol to be produced in association with the progress of the polycondensation reaction can be removed to the outside of a reaction system by: reducing the pressure in the reaction system to remove the dihydric alcohol by distillation; subjecting the dihydric alcohol and any other solvent to azeotropy to remove the dihydric alcohol by distillation; or any other method.

In the production for a polyester resin of the present invention, furandicarboxylic acid and esters thereof, diethylene glycol or polyalkylene ether, and other monomers excluding polyhydric alcohols may be used.

Examples of the other monomers include dicarboxylic acid components including: aromatic dicarboxylic acid such as terephthalic acid, isophthalic acid, naphthalene dicarboxylic acid, 4,4'-diphenyl sulfone dicarboxylic acid and 4,4'-biphenyl dicarboxylic acid, cycloaliphatic dicarboxylic acids such as 1,4-cyclohexane dicarboxylic acid and aliphatic dicarboxylic acids having an aromatic ring such as 1,3-phenylene dioxydiacetic acid, aliphatic dicarboxylic acids such as succinic acid, adipic acid, sebacic acid, and diglycolic acid; hydroxy dicarboxylic acid components such as p-hydroxybenzoate, 4-(2-hydroxyethoxy)benzoate, glycolic acid, and lactic acid; lactones such as caprolactone, butyrolactone, and valerolactone;

aliphatic diamines such as ethylene diamine, trimethylene diamine, hexamethylene diamine, heptamethylene diamine, octamethylene diamine, and decamethylene diamine;

hydroxylamines such as 2-aminoethanol, 3-aminopropanol, 1-amino-2-propanol, 4-aminobutanol, 5-aminopentanol, 6-aminohexanol, and 3-aminomethyl-3,5,5-trimethylcyclohexanol;

aromatic hydroxylamines and aromatic diamine-based compounds such as 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenyl methane, 4-amino-4'-hydroxydiphenyl sulfide, 4,4'-diaminodiphenyl sulfide (thiodianiline), 4,4'-diaminodiphenyl sulfone, 2,5-diaminotoluene, 4,4'-ethylenedianiline, 4,4'-diaminodiphenoxy ethane, 4,4'-diaminodiphenyl methane (methylene dianiline), and 4,4'-diaminodiphenyl ether (oxydianiline);

vinyl compounds such as styrene, vinyltoluene, α-methylstyrene, chlorstyrene, dichlorstyrene, vinylnaphthalene, ethylvinyl ether, methylvinyl ketone, methyl acrylate, ethyl acrylate, methyl methacrylate, acrylonitrile, and methacrylonitrile; and allyl compounds such as diallyl phthalate, diallyl fumarate, diallyl succinate, and triallyl cyanurate.

One kind of them may be used alone, or two or more kinds of them may be used in combination.

In addition, the other monomer is added in an amount of preferably 50 parts by weight or less, or more preferably 5 parts by weight or less with respect to the total amount of the raw materials, i.e., 100 parts by weight.

Although the reaction proceeds by virtue of the autocatalytic action of the dicarboxylic acid even when the catalyst is not added, the catalyst is preferably added because the concentration of the dicarboxylic acid reduces in association with the progress of the reaction. Preferable examples of the catalyst to be used include: metal oxides and metal salts; organometallic compounds each formed of tin, lead, titanium, or the like; and tetravalent hafnium compounds such as hafnium (IV) chloride and hafnium(IV) chloride.(THF)$_2$.

The endpoint of the esterification step is the time point at which the reaction mixture becomes transparent, and the endpoint can be easily identified.

In the subsequent polycondensation step, the reaction system is heated to a temperature in the range of 180° C. to 280° C., or preferably 180° C. to 240° C., and then the polycondensation reaction is initiated. The polycondensation reaction is preferably performed in a vacuum. An optimum catalyst for the polycondensation is specifically, for example, any one of the following compounds: acetates and carbonates of lead, zinc, manganese, calcium, cobalt, magnesium, and the like, metal oxides of magnesium, zinc, lead, antimony, and the like, and organometallic compounds each formed of tin, lead, titanium, or the like. Alternatively, titanium alkoxide can be used as a catalyst effective for both the steps. The time point at which the catalyst is added is as follows: the catalyst may be added in each of the esterification step and the polycondensation step separately, or the catalyst in the polycondensation step may be added from the outset. Upon addition of the catalyst, the furandicarboxylic acid and the dihydric alcohol may be heated as required, or the catalyst may be added in multiple portions.

In the polycondensation reaction subsequent to the esterification, the polycondensation reaction can be promoted by removing an excessive amount of the dihydric alcohol which was not consumed in the esterification step, or a dihydric alcohol produced as a by-product from the reaction system. The dihydric alcohol can be removed to the outside of the reaction system by a method such as a method involving reducing the pressure in the reaction system to remove the dihydric alcohol by distillation, or a method involving subjecting the dihydric alcohol and any other solvent to azeotropy to remove the dihydric alcohol by distillation. In addition, solid phase polymerization can be performed by a known method after a polymer has been obtained by the polycondensation reaction.

The polyester resin of the present invention obtained in such polycondensation step has a number average degree of polymerization of 5 or more to 700 or less, or preferably 6 or more to 600 or less.

The molecular weight of the polyester resin of the present invention is measured by a gel permeation chromatography (GPC) method involving dissolving the resin in 1,1,1,3,3,3-hexafluoro-2-propanol (HFIP). The number average molecular weight measured by the molecular weight measurement is 1,000 or more to 160,000 or less, or preferably 1,500 or more to 140,000 or less.

The polyester resin of the present invention is characterized by containing the structural units represented by the general formulae (1) and (2). The content of the structural unit represented by the general formula (1) to be incorporated into the polyester resin falls within the range of 0.1 mol % or more to 49.9 mol % or less, or preferably 0.1 mol % or more to 49.0 mol % or less with respect to the total of the structural units represented by the general formulae (1) and (2). In addition, the content of the structural unit represented by the general formula (2) to be incorporated into the polyester resin falls within the range of 50.1 mol % or more to 99.9 mol % or less, or preferably 51.0 mol % or more to 99.9 mol % or less with respect to the total of the structural units represented by the general formulae (1) and (2).

The polyester resin of the present invention is characterized by containing the structural units represented by the general formulae (1) and (3). The content of each of the structural units represented by the general formulae (1) and (3) in the polyester resin of the present invention is not particularly limited. The content of the structural unit represented by the general formula (1) to be incorporated into the polyester resin falls within the range of preferably 20.0 mol % or more to 99.9 mol % or less, or particularly preferably 30.0 mol % or more to 99.5 mol % or less with respect to the total of the structural units represented by the general formulae (1) and (3). In addition, the content of the structural unit represented by the general formula (3) to be incorporated into the polyester resin falls within the range of preferably 0.1 mol % or more to 80.0 mol % or less, or particularly preferably 0.5 mol % or more to 70.0 mol % or less with respect to the total of the structural units represented by the general formulae (1) and (3).

Structural units other than the structural units represented in the general formula (1) and the general formula (2), or the general formula (1) and the general formula (3) may be incorporated in the polyester resin of the present invention. Examples of the other structural units include dicarboxylic acid components including: aromatic dicarboxylic acids such as terephthalic acid, isophthalic acid, naphthalene dicarboxylic acid, 4,4'-diphenyl sulfone dicarboxylic acid and 4,4'-biphenyl dicarboxylic acid, cycloaliphatic dicarboxylic acids such as 1,4-cyclohexane dicarboxylic acid, aliphatic dicarboxylic acids having an aromatic ring such as 1,3-phenylene dioxydiacetic acid, aliphatic dicarboxylic acids such as succinic acid, adipic acid, sebacic acid, and diglycolic acid, and esters of the above dicarboxylic acids; hydroxy dicarboxylic acid components including p-hydroxybenzoate, 4-(2-hydroxyethoxy)benzoate, glycolic acid, and lactic acid; lactones including caprolactone, butyrolactone, and valerolactone; aliphatic dimines including ethylene diamine, trimethylene diamine, hexamethylene diamine, heptamethylene diamine, octamethylene diamine, and decamethylene diamine; hydroxylamines including 2-aminoethanol, 3-aminopropanol, 1-amino-2-propanol, 4-aminobutanol, 5-aminopentanol, 6-aminohexanol, and 3-aminomethyl-3,5,5-trimethylcyclohexanol; aromatic hydroxylamines and aromatic diamine-based compounds including 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenyl methane, 4-amino-4'-hydroxydiphenyl sulfide, 4,4'-diaminodiphenyl sulfide (thiodianiline), 4,4'-diaminodiphenyl sulfone, 2,5-diaminotoluene, 4,4'-ethylenedianiline, 4,4'-diaminodiphenoxy ethane, 4,4'-diaminodiphenyl methane(methylene dianiline), and 4,4'-diaminodiphenyl ether (oxydianiline).

Vinyl compounds such as styrene, vinyltoluene, α-methylstyrene, chlorstyrene, dichlorstyrene, vinylnaphthalene, ethylvinyl ether, methylvinyl ketone, methyl acrylate, ethyl acrylate, methyl methacrylate, acrylonitrile, and methacrylonitrile; and allyl compounds such as diallyl phthalate, diallyl fumarate, diallyl succinate, and triallyl cyanurate.

A known polycondensation reaction can be used when any one of the dicarboxylic acids, the diamines, the hydroxycarboxylic acids, and the lactones listed above is introduced. When any one of the vinyl compounds, the allyl compounds, and the like listed above is used, it is sufficient that a polymerization method be selected in accordance with a method of introducing any other structural unit; for example, a known radical polymerization reaction may be used.

In addition, the other structural unit may be introduced at the time of copolymerization in the presence of the furandicarboxylic acid or the ester thereof, and the polyhydric alcohol, or may be introduced after the copolymerization.

The content of the other structural unit to be incorporated into the polyester resin falls within the range of 50 parts by weight or less, or preferably 5 parts by weight or less with respect to the total amount of the polyester resin, i.e., 100 parts by weight.

A composition for a molded article of the present invention contains the above polyester resin. The content of the polyester resin to be incorporated into the composition for a molded article of the present invention is preferably 50 wt % or more to 100 wt % or less. Further, the composition for a molded article of the present invention may contain an additive as required to such an extent that no functions of the above polyester resin are inhibited. Specific examples of the additive include a flame retardant, a colorant, an internal release agent, an antioxidant, a UV absorber, and various fillers. The content of the additive to be incorporated into the composition for a molded article of the present invention is preferably 0.5 wt % or more to 50 wt % or less.

A molded article which can be molded out of the above composition for a molded article can be used in a wide variety of fields because of its excellent impact resistance, and examples of the molded article include fibers, films, sheets, and various molded articles. Specific examples of the molded article include containers such as a bottle, pipes, tubes, sheets, plates, and films. In particular, a preferable molded article is, for example, a component for: an ink tank of an ink-jet printer; a toner container of an electrophotographic apparatus; a packaging resin; or the package of an office machine such as a copying machine or printer, or of a camera.

The molded article can be molded out of the above composition for a molded article by employing the same method as a method of molding a thermoplastic resin, and, for example, compression molding, extrusion molding, or injection molding can be utilized.

The polyester resin of the present invention is specifically detailed. However, the technical scope of the present invention is not limited to the following description. It should be noted that a polyester resin in each of the following examples and comparative examples was evaluated by employing the following measurement methods.

(Molecular Weight Measurement)
Analytical instrument: An Alliance 2695 manufactured by Waters
Detector: A differential refractometer
Eluent: A 5-mM solution of sodium trifluoroacetate in hexafluoroisopropanol
Flow rate: 1.0 ml/min
Column temperature: 40° C.
Molecular weight: A number average molecular weight (Mn), a weight average molecular weight (Mw), and a degree of polydispersity (Mw/Mn) were determined by using a PMMA standard.

(FT-IR Measurement)
Apparatus name: A Fourier transform infrared spectrophotometer FT-710 manufactured by HORIBA, Ltd.
Measurement resolution: 2 cm$^{-1}$
Number of scans: 10 times
Measurement gain: 1
Measurement wavenumber range:
  4,000 to 400 cm$^{-1}$ (NMR Measurement)
Apparatus name: A nuclear magnetic resonator JNM-ECA-400 manufactured by JEOL Ltd.
Measurement condition: $^1$H-NMR
Solvent: $CF_3COOD$ (Measurement of Glass Transition Temperature (Tg) and Melting Point (Tm))
Apparatus name: A differential scanning calorimeter Q1000 manufactured by TA Instruments
Pan: A platinum pan
Sample weight: 3 mg
Temperature at which temperature increase is initiated:
  30° C.
Rate of temperature increase:
  10° C./min
Atmosphere: Nitrogen (Measurement of Heat Decomposition Temperature (Td))
Apparatus name: A thermogravimetric apparatus Q500 manufactured by TA Instruments
Pan: A platinum pan
Sample weight: 3 mg
Measurement temperature:
  50 to 500° C.
Rate of temperature increase:
  50° C./min
Measurement mode: High resolution dynamic
Atmosphere: Nitrogen
Heat decomposition temperature;
  The temperature at which the weight reduced by 10% was defined as the heat decomposition temperature.

(Sample Molding)
The sample was pulverized and molded into a strip specimen measuring 80 mm long by 10 mm wide by 4 mm thick with a fully electric injection molding machine SE18DU manufactured by Sumitomo Heavy Industries, Ltd.

(Measurement of Impact Resistance)

The molded strip specimen was subjected to a Charpy impact test with a digital impact tester DG-UB manufactured by Toyo Seiki Seisaku-Sho, Ltd.
Test method: ISO 179/1eA (test piece No. 1 A notch, impact direction edgewise)
Hammer: 4J In each of the following examples and comparative examples, the term "DEG" represents diethylene glycol, the term "PEF" represents poly(ethylene-2,5-furandicarboxylate), and the term "PEG" represents polyethylene glycol. In addition, the symbol "%" for each of DEG, PEF, and PEG represents "mol %".

Example 1

Preparation of polyester resin (DEG (52%)-PEF) formed of poly(ethylene-2,5-furandicarboxylate) and poly(diethylene-2,5-furandicarboxylate)

A 1-L reaction vessel manufactured by SUS Corporation mounted with a temperature gauge and a stirring blade manufactured by SUS Corporation was prepared. Raw materials were loaded into the reaction vessel manufactured by SUS Corporation so that a ratio of diethylene glycol to 2,5-furandicarboxylic acid might be 52 mol %. In other words, 2,5-furandicarboxylic acid (312.2 g), ethylene glycol (309.4 g), diethylene glycol (110.9 g), a monobutyltin oxide catalyst (0.59 g), and a titanium-n-butoxide catalyst (0.59 g) were loaded.

The stirring of the contents was initiated while nitrogen was introduced into the reaction vessel manufactured by SUS Corporation. At the same time, the temperature of those contents was increased with a mantle heater. After the temperature in the vessel had reached 160° C., the temperature was held at the temperature for 1 hour, and, furthermore, was held at 165° C. for 1 hour and at 185° C. for 2 hours.

The reduction of the pressure in the vessel was initiated at 185° C. The pressure was reduced to about 133 Pa over about 1 hour, and, furthermore, the temperature in the vessel was increased to 230° C. The reaction was continued at about 133 Pa and 230° C. for 4.5 hours. Thus, DEG (52%)-PEF was prepared.

Example 2

Preparation of polyester resin (DEG (80%)-PEF) formed of poly(ethylene-2,5-furandicarboxylate) and poly(diethylene-2,5-furandicarboxylate)

Preparation was performed in the same manner as in Example 1 except for the following: raw materials were loaded in such amounts that a ratio of diethylene glycol to 2,5-furandicarboxylic acid might be 80 mol %, in other words, 2,5-furandicarboxylic acid (312.2 g), ethylene glycol (274.5 g), diethylene glycol (170.6 g), a monobutyltin oxide catalyst (0.61 g), and a titanium-n-butoxide catalyst (0.61 g) were loaded. Thus, DEG (80%)-PEF was prepared.

Example 3

Preparation of polyester resin (PEG (4%)-PEF) formed of poly(ethylene-2,5-furandicarboxylate) and poly(polyethylene-2,5-furandicarboxylate)

Preparation was performed in the same manner as in Example 1 except for the following: raw materials were loaded in such amounts that a ratio of polyethylene glycol to 2,5-furandicarboxylic acid might be 4 mol %, in other words, 2,5-furandicarboxylic acid (327.8 g), ethylene glycol (387.8 g), polyethylene glycol having a weight average molecular weight of 600 (50.4 g), a monobutyltin oxide catalyst (0.61 g), and a titanium-n-butoxide catalyst (0.61 g) were loaded. Thus, PEG (4%)-PEF was prepared.

Comparative Example 1

Preparation of poly(ethylene-2,5-furandicarboxylate) (PEF)

Preparation was performed in the same manner as in Example 1 except for the following: 2,5-furandicarboxylic acid (312.2 g), ethylene glycol (374.3 g), a monobutyltin oxide catalyst (0.55 g), and a titanium-n-butoxide catalyst (0.55 g) were loaded as raw materials. Thus, PEF was prepared.

Comparative Example 2

Preparation of polyester resin (DEG (20%)-PEF) formed of poly(ethylene-2,5-furandicarboxylate) and poly(diethylene-2,5-furandicarboxylate)

Preparation was performed in the same manner as in Example 1 except for the following: raw materials were loaded in such amounts that a ratio of diethylene glycol to 2,5-furandicarboxylic acid might be 20 mol %, in other words, 2,5-furandicarboxylic acid (312.2 g), ethylene glycol (349.3 g), diethylene glycol (42.65 g), a monobutyltin oxide catalyst (0.56 g), and a titanium-n-butoxide catalyst (0.56 g) were loaded. Thus, DEG (20%)-PEF was prepared.

Figure 1:
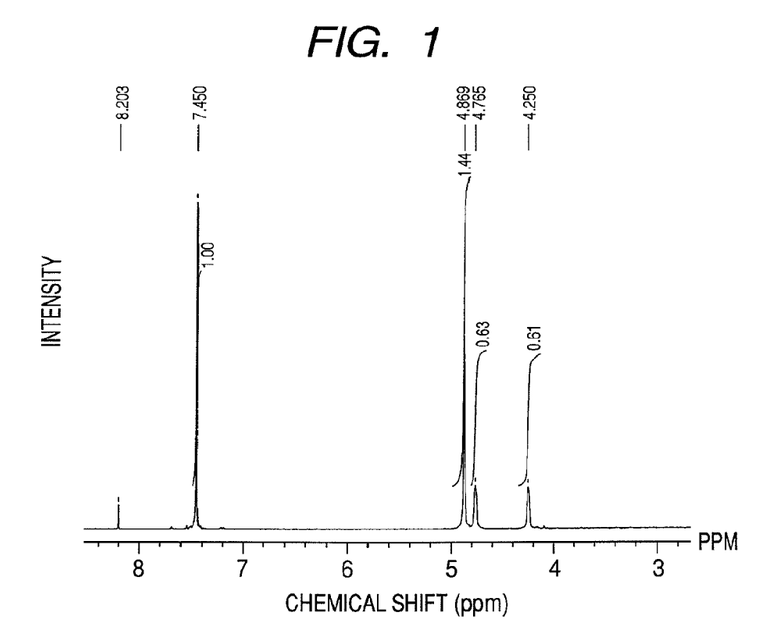
FIG. 1 is a view showing the spectrum of the polyester resin of Example 1 of the present invention by $^1$H-NMR measurement.
Figure 2:
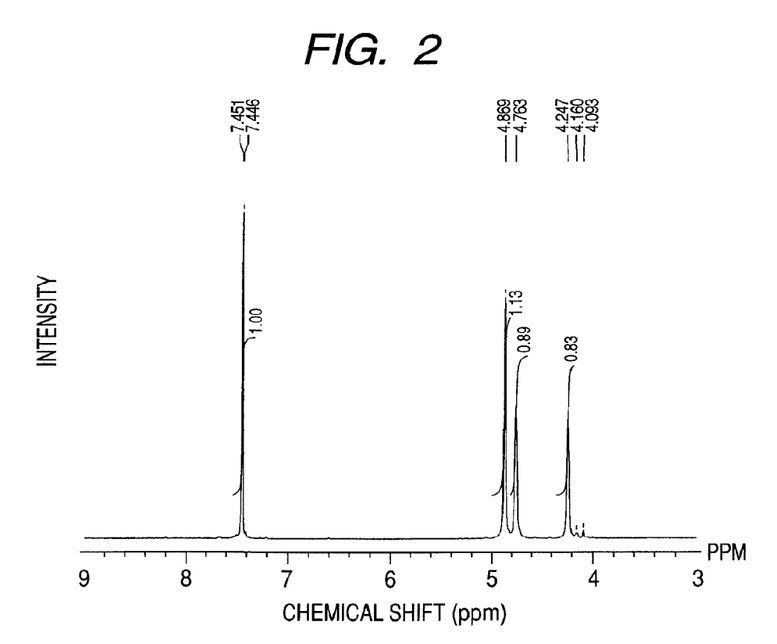
FIG. 2 is a view showing the spectrum of the polyester resin of Example 2 of the present invention by $^1$H-NMR measurement.
Figure 3:
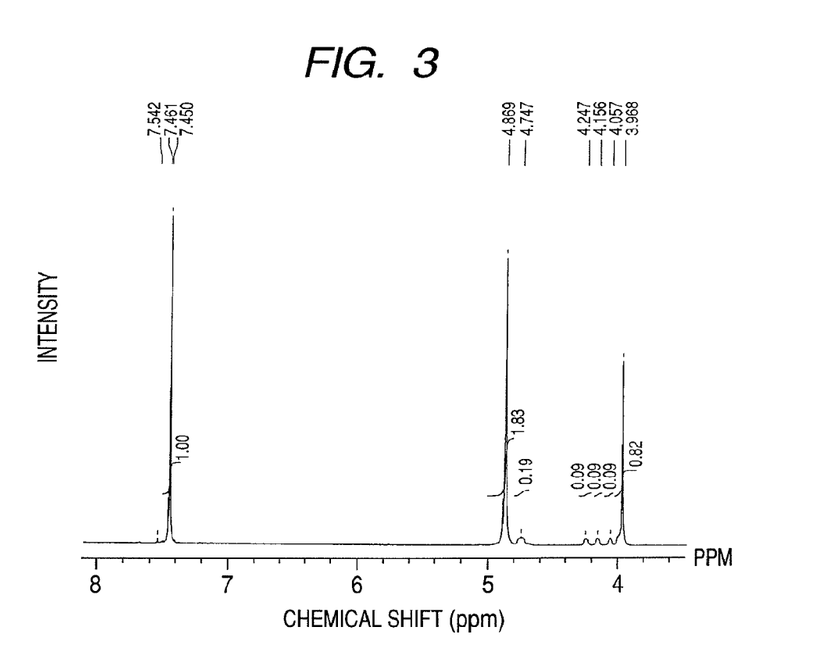
FIG. 3 is a view showing the spectrum of the polyester resin of Example 3 of the present invention by $^1$H-NMR measurement.
Figure 4:
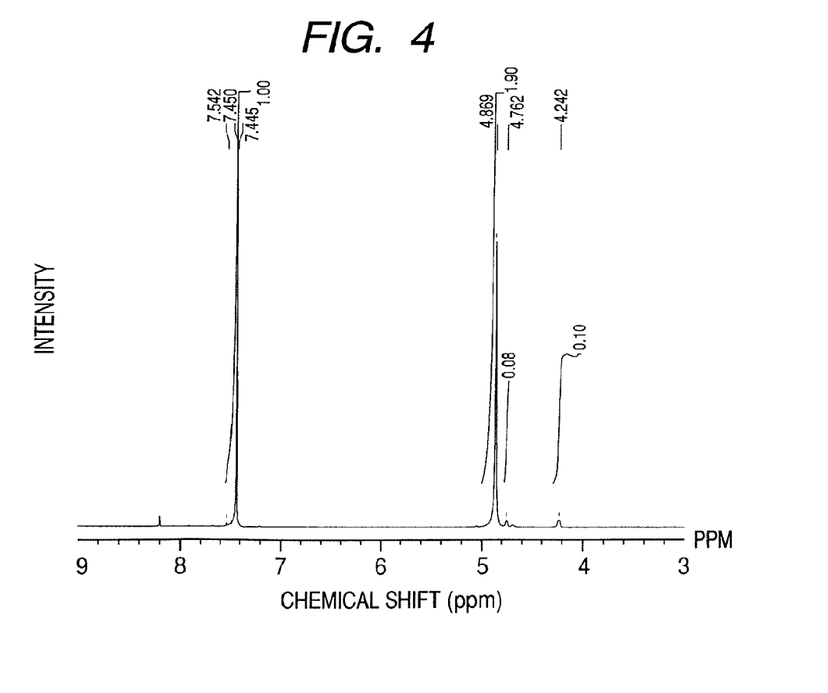
FIG. 4 is a view showing the spectrum of the polyester resin of Comparative Example 1 of the present invention by $^1$H-NMR measurement.
Figure 5:
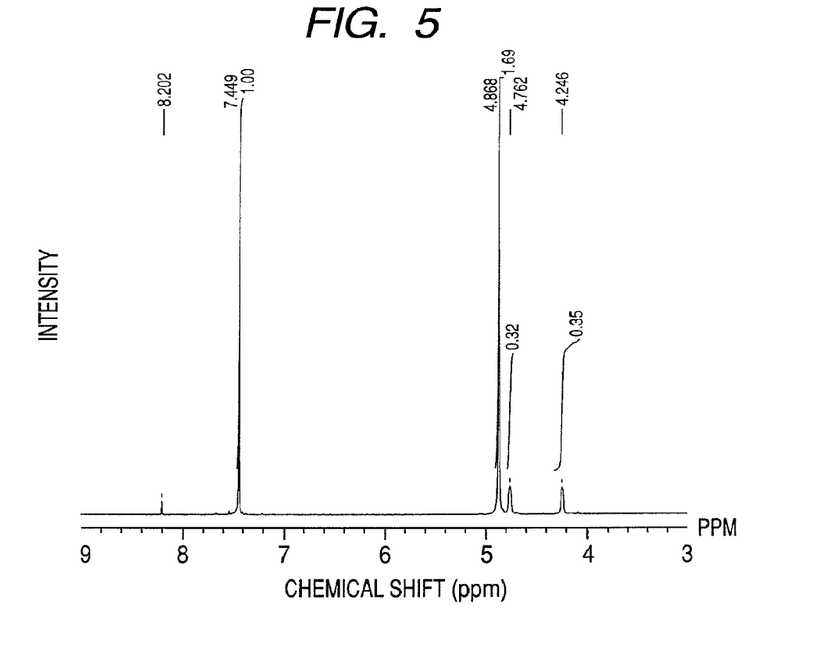
FIG. 5 is a view showing the spectrum of the polyester resin of Comparative Example 2 of the present invention by $^1$H-NMR measurement.
Figure 6:
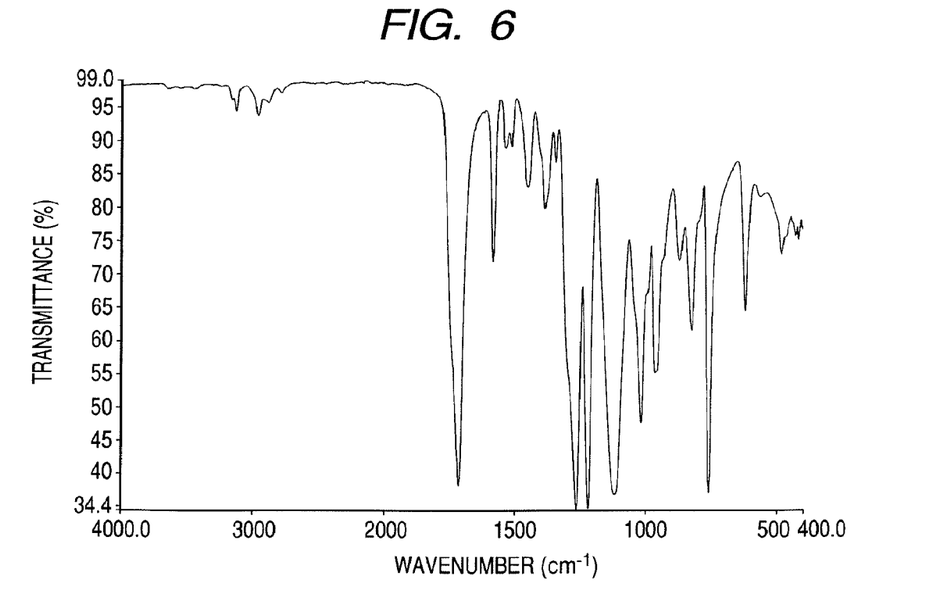
FIG. 6 is a view showing the spectrum of the polyester resin of Example 1 of the present invention by FT-IR measurement.
Figure 7:
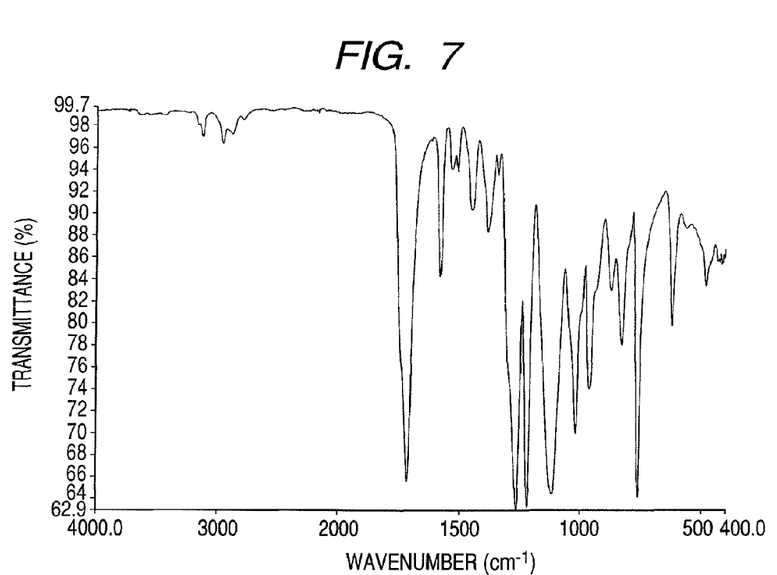
FIG. 7 is a view showing the spectrum of the polyester resin of Example 2 of the present invention by FT-IR measurement.
Figure 8:
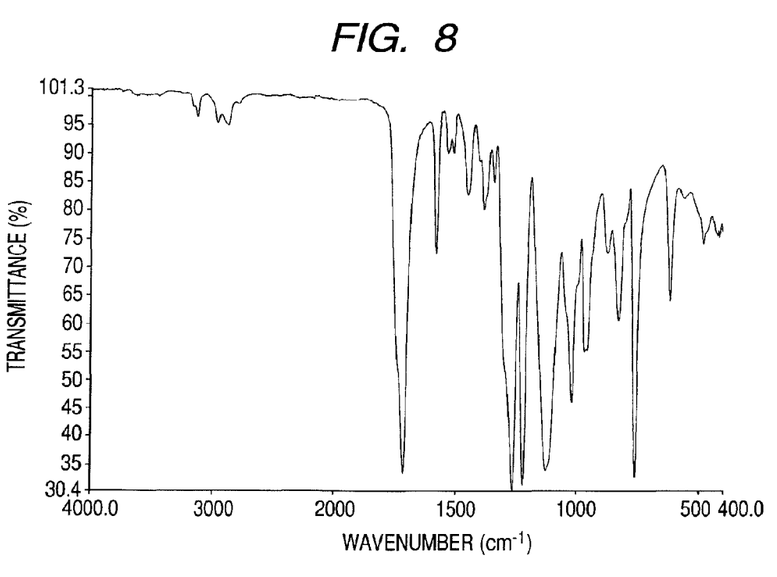
FIG. 8 is a view showing the spectrum of the polyester resin of Example 3 of the present invention by FT-IR measurement.
Figure 9:
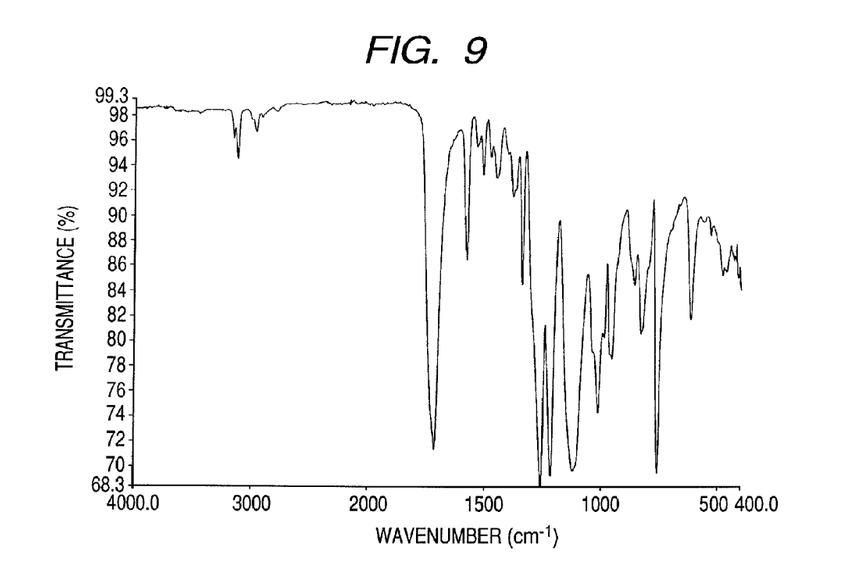
FIG. 9 is a view showing the spectrum of the polyester resin of Comparative Example 1 of the present invention by FT-IR measurement.
Figure 10:
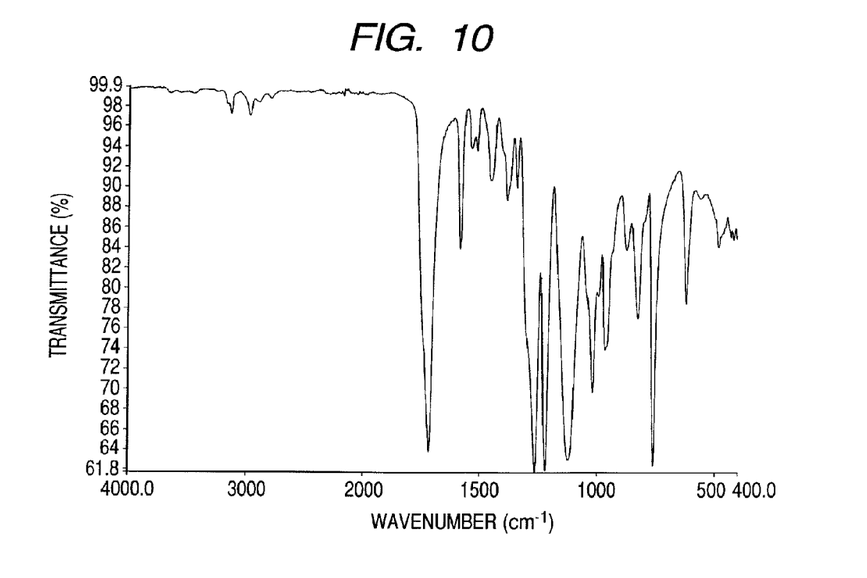
FIG. 10 is a view showing the spectrum of the polyester resin of Comparative Example 2 of the present invention by FT-IR measurement.
Figure 11:
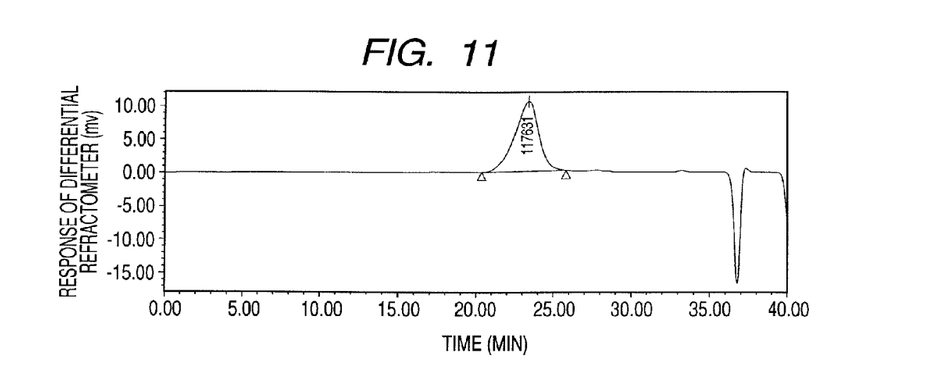
FIG. 11 is a view showing the chromatogram of the polyester resin of Example 1 of the present invention by GPC measurement.
Figure 12:
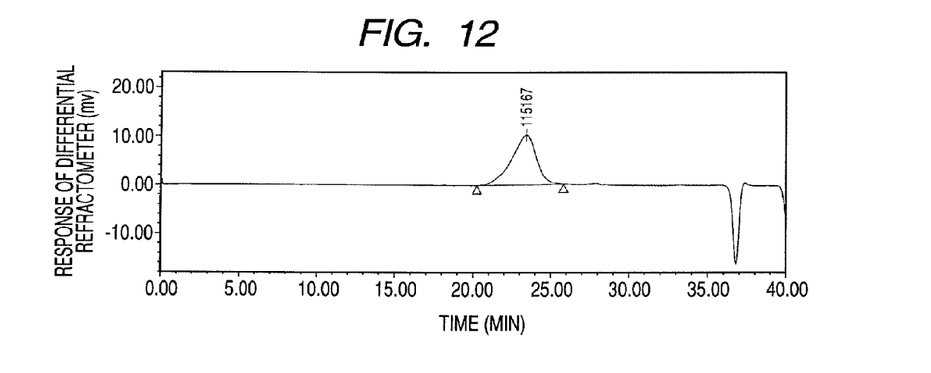
FIG. 12 is a view showing the chromatogram of the polyester resin of Example 2 of the present invention by GPC measurement.
Figure 13:
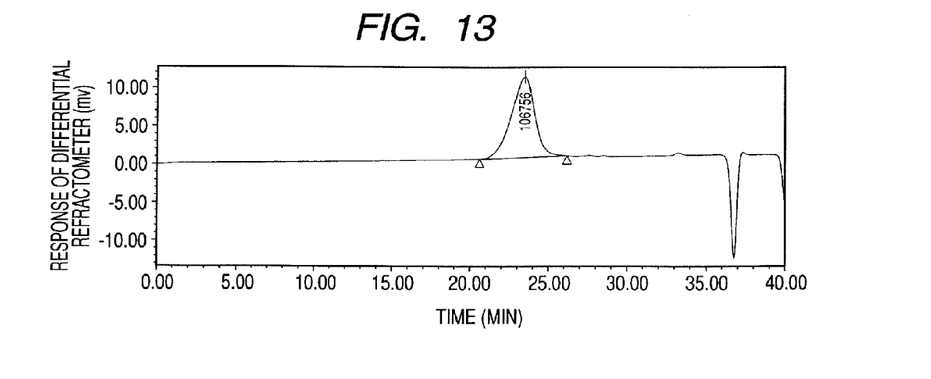
FIG. 13 is a view showing the chromatogram of the polyester resin of Example 3 of the present invention by GPC measurement.
Figure 14:
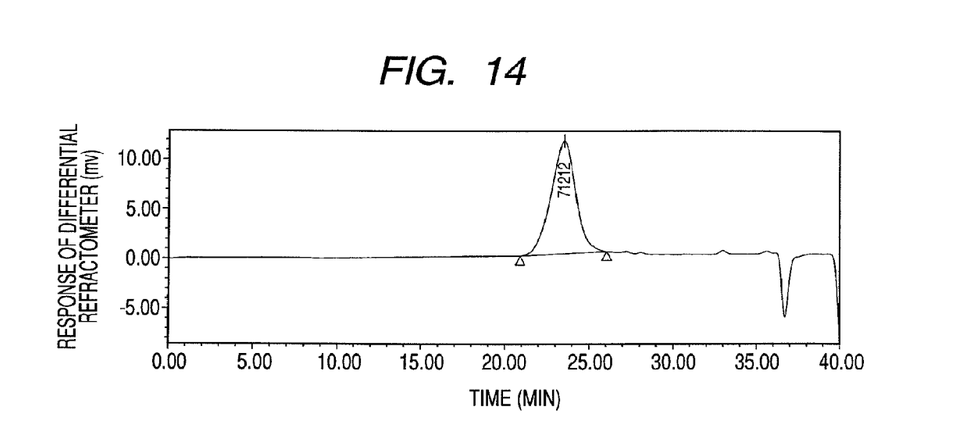
FIG. 14 is a view showing the chromatogram of the polyester resin of Comparative Example 1 of the present invention by GPC measurement.
Figure 15:
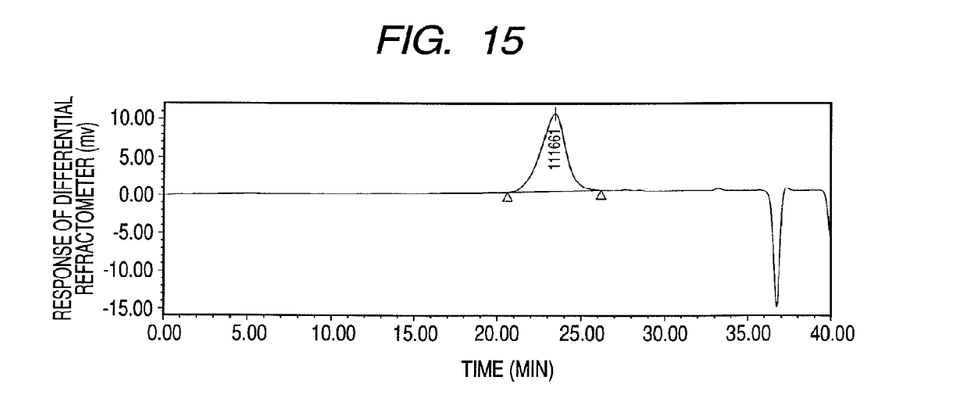
FIG. 15 is a view showing the chromatogram of the polyester resin of Comparative Example 2 of the present invention by GPC measurement.

FIG. 1 illustrates a $^1$H-NMR spectrum of DEG (52%)-PEF in Example 1.
FIG. 2 illustrates a $^1$H-NMR spectrum of DEG (80%)-PEF in Example 2.
FIG. 3 illustrates a $^1$H-NMR spectrum of DEG (4%)-PEF in Example 3.
FIG. 4 illustrates a $^1$H-NMR spectrum of PEF in Comparative Example 1.
FIG. 5 illustrates a $^1$H-NMR spectrum of DEG (20%)-PEF in Comparative Example 2.
FIG. 6 illustrates an FT-IR spectrum of DEG (52%)-PEF in Example 1.
FIG. 7 illustrates an FT-IR spectrum of DEG (80%)-PEF in Example 2.
FIG. 8 illustrates an FT-IR spectrum of PEG (4%)-PEF in Example 3.
FIG. 9 illustrates an FT-IR spectrum of PEF in Comparative Example 1.
FIG. 10 illustrates an FT-IR spectrum of DEG (20%)-PEF in Comparative Example 2.
FIG. 11 illustrates a GPC chromatogram of DEG (52%)-PEF in Example 1.
FIG. 12 illustrates a GPC chromatogram of DEG (80%)-PEF in Example 2.
FIG. 13 illustrates a GPC chromatogram of PEG (4%)-PEF in Example 3.
FIG. 14 illustrates a GPC chromatogram of PEF in Comparative Example 1.
FIG. 15 illustrates a GPC chromatogram of DEG (20%)-PEF in Comparative Example 2.

Next, Table 1 shows the results of the measurement of the glass transition temperature (Tg), the melting point (Tm), and the heat decomposition temperature (Td) in each of Examples 1, 2, and 3, and Comparative Examples 1 and 2, the results of the measurement of the molecular weight in each of the examples and comparative examples, and impact strengths in the examples and comparative examples.

TABLE 1

|  | Tg/ °C. | Tm/ °C. | Td/ °C. | Molecular weight | | | Impact strength/ kJ·m$^{-2}$ |
|  |  |  |  | Mn/ 10,000 | Mw/ 10,000 | Mw/ Mn |  |
| --- | --- | --- | --- | --- | --- | --- | --- |
| Example 1 | 72 | — | 357 | 12 | 19 | 1.6 | 1.47 |
| Example 2 | 64 | — | 357 | 12 | 20 | 1.7 | 1.10 |
| Example 3 | 62 | 201 | 357 | 10 | 16 | 1.5 | 1.37 |
| Comparative Example 1 | 87 | — | 357 | 6.5 | 9.1 | 1.4 | 0.70 |
| Comparative Example 2 | 80 | — | 357 | 11 | 17 | 1.6 | 0.87 |

As can be seen from the table, the polyester resin of each of the examples has a larger impact strength than those of the polyester resins of the comparative examples, so the impact resistance of the polyester resin of each of the examples is improved.

INDUSTRIAL APPLICABILITY

The polyester resin of the present invention can be utilized for producing a molded article excellent in impact resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A polyester resin, consisting essentially of:
a structural unit represented by general formula (1); and
a structural unit represented by general formula (3):

(1)

where R$_1$ represents an aliphatic hydrocarbon group, which may be substituted, (3)

where R$_2$ represents an alkylene group, and m represents an integer in a range of 2 to 1,140, provided that a case where R$_2$ represents an ethylene group and m represents 2 is excluded, wherein a content of the structural unit represented by the general formula (1) in the polyester resin is 20 mol % to 99.9 mol % with respect to a total of the structural units represented by the general formulae (1) and (3), and wherein a number average molecular weight is 100,000 to 120,000.

2. The polyester resin according to claim 1, wherein R$_1$ represents an ethylene group, and R$_2$ represents an ethylene group.

3. A composition for a molded article comprising the polyester resin according to claim 1.

4. A molded article obtained by molding the composition according to claim 3.

5. The polyester resin according to claim 1, wherein the content of the structural unit represented by the general formula (1) is 30 mol % or more to 99.5 mol % or less with respect to the total of the structural units represented by the general formulae (1) and (3).

6. The polyester resin according to claim 1, wherein R$_2$ is selected from the group consisting of an ethylene group, a propylene group, an n-butylene group, an n-pentylene group, an n-hexylene group, and n-heptylene group.

7. The polyester resin according to claim 1, wherein R$_1$ is an ethylene group or an n-butylene group.

* * * * *